(12) United States Patent  
Bellows et al.

(10) Patent No.: US 7,757,040 B2
(45) Date of Patent: Jul. 13, 2010

(54) MEMORY COMMAND AND ADDRESS CONVERSION BETWEEN AN XDR INTERFACE AND A DOUBLE DATA RATE INTERFACE

(75) Inventors: Mark D. Bellows, Rochester, MN (US); John D. Irish, Rochester, MN (US); David A. Norgaard, Rochester, MN (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/680,751

(22) Filed: Mar. 1, 2007

(65) Prior Publication Data

US 2008/0183925 A1    Jul. 31, 2008

Related U.S. Application Data

(63) Continuation-in-part of application No. 11/668,725, filed on Jan. 30, 2007.

(51) Int. Cl.
*G06F 12/00* (2006.01)
(52) U.S. Cl. ..................................... 711/112; 711/202
(58) Field of Classification Search .................. 711/167, 711/169, 154, 170, 202, 112
See application file for complete search history.

(56) References Cited

U.S. PATENT DOCUMENTS

| 5,615,328 | A | * | 3/1997 | Hadderman et al. ........... 714/22 |
| 6,553,451 | B2 | | 4/2003 | Wu et al. |
| 6,725,319 | B2 | * | 4/2004 | Ryan .......................... 710/315 |
| 2007/0192536 | A1 | * | 8/2007 | Erickson et al. ............. 711/112 |
| 2007/0192563 | A1 | * | 8/2007 | Rajan et al. .................. 711/202 |

* cited by examiner

*Primary Examiner*—Pierre-Michel Bataille
(74) *Attorney, Agent, or Firm*—Heslin Rothenberg Farley & Mesiti, PC (57) ABSTRACT

A command translation method, apparatus and system are provided for interfacing a processor and a memory. The processor initiates a memory system command in an extreme data rate (XDR) command format which is automatically converted by the command translation method, apparatus and system into a memory system command in a double data rate (DDR) format for forwarding to the memory. Associated with converting the memory system command to the DDR command format is controlling timing of one or more signals presented to the memory interface, the one or more signals being associated with processing the memory system command in the DDR command format. The processor has associated therewith an XDR memory interface controller which adjusts one or more timing parameters of the memory system command in the XDR command format so that DDR timing requirements for the memory system command in the DDR command format are met.

22 Claims, 6 Drawing Sheets

ADDRESS FIELD SELECT (DDR2 EXAMPLE)
BITS FROM XDR INTERFACE ARE SELECTED DEPENDING ON DDR2 CONFIGURATION

| XDR INTERFACE | ROWADR(15:0) | COLADR(11:0) | BANK(2:0) |
|---|---|---|---|
| DDR2 64Mbx8 - 4 BANK | ROWADR(13:0) | COLADR(9:3) | BANK(1:0) |
| DDR2 128Mbx4 - 4 BANK | ROWADR(13:0) | COLADR(11,9:3) | BANK(1:0) |
| DDR2 128Mbx8 - 8 BANK | ROWADR(13:0) | COLADR(9:3) | BANK(2:0) |
| DDR2 256Mbx8 - 8 BANK | ROWADR(14:0) | COLADR(9:3) | BANK(2:0) |
| DDR2 256Mbx4 - 8 BANK | ROWADR(13:0) | COLADR(11,9:3) | BANK(2:0) |
| DDR2 512Mbx4 - 8 BANK | ROWADR(14:0) | COLADR(11,9:3) | BANK(2:0) |

FIG. 3

READ COMMAND

| CYCLE | 01 | 02 | 03 | 04 | 05 | 06 | 07 | 08 | 09 | 10 | 11 | 12 | 13 | 14 | 15 | 16 | 17 | 18 |
|---|---|---|---|---|---|---|---|---|---|---|---|---|---|---|---|---|---|---|
| XDR COMMAND /ADDRESS | ACT | | | | | RD | | CM2 | | | | | | | | | | |
| DDR2/3 COMMAND | | | ACT | | | | | RD | | | | | | | | | | |
| DDR2/3 ADDRESS | | | ROW | | | | | COL | | | | | | | | | | |
| DDR2/3 BANK | | | BNK | | | | | BNK | | | | | | | | | | |
| DATAFLOW READ TIME | | | | | | | | | | | | | | RD | | | | |
| DATAFLOW WRITE TIME | | | | | | | | | | | | | | | | | | |
| DATAFLOW DATA | | | | | | | | | | | | | | | D1 | D2 | D3 | D4 |
| DDR2/3 DATA | | | | | | | | | | | | | | d1-2 | d3-4 | d5-6 | d7-8 | |
| ODT - TRANSLATION CHIP | | | | | | | | | | | | | ON | ON | ON | ON | | |
| ODT - ACCESED DDR2/3 DIMM | | | | | | | | | | | | | | | | | | |
| ODT - OTHER DDR2/3 DIMMS | | | | | | | | | | | | | ON | ON | ON | ON | | |

FIG. 4

WRITE COMMAND

| CYCLE | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| XDR COMMAND /ADDRESS | ACT | | | | | WRT | | CM2 | | | | | | | | |
| DDR2/3 COMMAND | | | ACT | | | | | WRT | | | | | | | | |
| DDR2/3 ADDRESS | | | ROW | | | | | COL | | | | | | | | |
| DDR2/3 BANK | | | BNK | | | | | BNK | | | | | | | | |
| DATAFLOW READ TIME | | | | | | | | | | | | | | | | |
| DATAFLOW WRITE TIME | | | | | | | | | | | WRT | | | | | |
| DATAFLOW DATA | | | | | | | | | | | | D1 | D2 | D3 | D4 | |
| DDR2/3 DATA | | | | | | | | | | | | | d1-2 | d3-4 | d5-6 | d7-8 |
| ODT - TRANSLATION CHIP | | | | | | | | | | | | | | | | |
| ODT - DESTINATION DDR2/3 DIMM | | | | | | | | | | | | | | | | |
| ODT - OTHER DDR2/3 DIMMS | | | | | | | | | | | | ON | ON | ON | ON | |

FIG. 5

REFRESH COMMAND

| CYCLE | 01 | 02 | 03 |
|---|---|---|---|
| XDR COMMAND /ADDRESS | REF | | |
| DDR2/3 COMMAND | | | REF |
| DDR2/3 ADDRESS | | | |
| DDR2/3 BANK | | | |
| DATAFLOW READ TIME | | | |
| DATAFLOW WRITE TIME | | | |
| DATAFLOW DATA | | | |
| DDR2/3 DATA | | | |
| ODT - TRANSLATION CHIP | | | |
| ODT - DESTINATION DDR2/3 DIMM | | | |
| ODT - OTHER DDR2/3 DIMMS | | | |

FIG. 6

MEMORY COMMAND AND ADDRESS CONVERSION BETWEEN AN XDR INTERFACE AND A DOUBLE DATA RATE INTERFACE

CROSS-REFERENCE TO RELATED APPLICATION

This application is a continuation-in-part patent application of application Ser. No. 11/668,725, filed Jan. 30, 2007, entitled "Rank Select Operation Between an XIO Interface and a Double Data Rate Interface", the entirety of which is hereby incorporated herein by reference.

TECHNICAL FIELD

The present invention relates generally to computer systems, and more particularly, to methods, apparatuses, and systems for interfacing a processor issuing a memory system command in a first command format to a memory employing a second command format.

BACKGROUND OF THE INVENTION

A computer system typically includes a main processor coupled to a memory (e.g., a dynamic random access memory (DRAM)) via a memory controller. More particularly, one conventional computer system today may include a processor coupled to a double data rate (DDR) memory (e.g., synchronous dynamic random access memory (SDRAM)) via a DDR memory interface, such as a DDR link.

DDR memory is cheaper than other memory available today, such as extreme data rate (XDR) memory, and has a higher storage capacity than other memory. For example, XDR memory is limited in the amount of memory capacity it can support, and is more expensive than DDR2 or DDR3 memory. However, the DDR link may be slower than other links, such as an extreme input/output (XIO) link (or more generally an XDR interface). A width of the DDR link may be increased (e.g., to 288 bits) to increase the bandwidth thereof. However, this may result in the DDR link consuming too large a number of processor pins when used to couple DDR memory thereto. By requiring that the processor include a large number of pins, use of the DDR link can result in an increase in size of the processor, as well as of the cost associated therewith.

Another conventional computer system may include a processor coupled to an XDR memory via a memory interface, such as an XIO link. As described above, XDR memory is more expensive and has less storage capacity than DDR memory. However, the XIO link is a fast, narrow link (e.g., 72 bits wide). Therefore, the XIO link consumes fewer pins on a processor when used to couple memory thereto, i.e., compared with a DDR link. Consequently, use of an XIO link may enable the size of the processor and cost associated therewith to be reduced.

Thus, use of a DDR link coupled to a processor may cause an increase in the size of the processor and cost associated therewith, while use of XDR memory coupled to the processor may be more expensive and have less storage capacity than other memory options. Accordingly, improved methods, apparatuses and systems for interfacing a processor and a memory are needed.

SUMMARY OF THE INVENTION

The shortcomings of the prior art are overcome and additional advantages are provided through the provision, in one aspect, of a command translation method which includes: receiving a memory system command in a first command format, the first command format including an extreme data rate (XDR) command format; and automatically converting the memory system command in the first command format to a second command format, the second command format including a double data rate (DDR) command format.

In another aspect, an apparatus is provided for interfacing a processor employing a first command format and a memory employing a second command format. The apparatus includes a translation circuit adapted to couple a processor employing the first command format to memory employing the second command format. The translation circuit receives a memory system command from the processor in the first command format (the first command format including an extreme data rate (XDR) command format) and automatically converts the memory system command in the first command format to a second command format, wherein the second command format includes a double data rate (DDR) format.

In a further aspect, a system is provided which includes a processor adapted to generate a memory system command in a first command format, wherein the first command format includes an extreme data rate (XDR) command format. The system further includes a memory accessible by a memory system command in a second command format, wherein the second command format includes a double data rate (DDR) format. A translation circuit is coupled to the processor and to the memory for interfacing the processor and memory and for converting a memory system command in the first command format received from the processor to a memory system command in the second command format for forwarding to the memory.

Further, additional features and advantages are realized through the techniques of the present invention. Other embodiments and aspects of the invention are described in detail herein and are considered a part of the claimed invention.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, the present invention provides improved methods, apparatuses and systems for interfacing a processor and a memory. For example, the present invention provides a translation circuit (implemented, e.g., as a translation chip) that couples a processor to DDR memory (e.g., SDRAM) of a computer system. More specifically, the computer system may include an XDR interface, such as an extreme input/output (XIO) link coupling the processor to the translation circuit, and a DDR interface (e.g., DDR link) coupling the translation circuit to the DDR memory. The translation circuit comprises hardware adapted to convert a memory system command of a first format (i.e., a memory system command in XDR command format) issued by the processor to a command of a second format (i.e., a memory system command in DDR command format), which may be received and processed by the DDR memory. By employing an XIO link at the processor, the methods, apparatuses, and systems disclosed herein potentially reduce the size of the processor and cost associated therewith, while still allowing DDR memory to be employed, which is less expensive and has a higher storage capacity compared to other types of memory, such as XDR memory.

Unless otherwise specified, the phrase "memory system command" is used herein to include a memory command, an associated address and data protocols for the command. A "command format" refers to either an extreme data rate (XDR) command format or a double data rate (DDR) command format. Double data rate or DDR is used herein to include any existing or future double data rate version, including DDR1, DDR2, DDR3, etc., as defined by JEDEC Standard. By way of example, reference JESD79-2C, which is the JEDEC Standard for DDR2 DRAM, published May 2006. Further, the "associated address" includes both a row address component and a column address component, the number of bits of which are dependent upon the particular memory system configuration implemented.

Extreme data rate (XDR) memory systems, which are architected by Rambus, Inc. of Los Altos, Calif., provide high memory bandwidth by sending 8 data bits per clock signal over an extreme input/output (XIO) link from a memory interface controller associated with a processor to XDR memory, comprising for example, XDR dynamic random access memory (DRAM). An XIO link is today capable of receiving signal rates of 3.2 Gbps and above, allowing a memory interface controller to use fewer I/O, and therefore save on processor die size and cost. However, due to technical and financial considerations, XDR memory systems are limited in the amount of memory capacity they can support. An XDR memory is also more expensive than industry standard memories, such as double data rate 2 (DDR2) memory. In order to use a processor chip with an XIO link in an application which requires large amounts of memory, a translation circuit or chip is disclosed herein which converts XDR command and data protocols to DDR2 command and data protocols. This solution maintains the advantage of using an XIO link (with fewer pins on the expensive memory interface controller), while enabling the advantages of DDR memory (i.e., low cost and high capacity). Disclosed herein are a method, apparatus and system for converting XDR commands to DDR commands running at the same command rate (e.g., employing a translation chip without command buffering). Further, although applicable to any double data rate command format, DDR2 and/or DDR3 (referred to as DDR2/3) are employed in the examples below.

Figure 1:
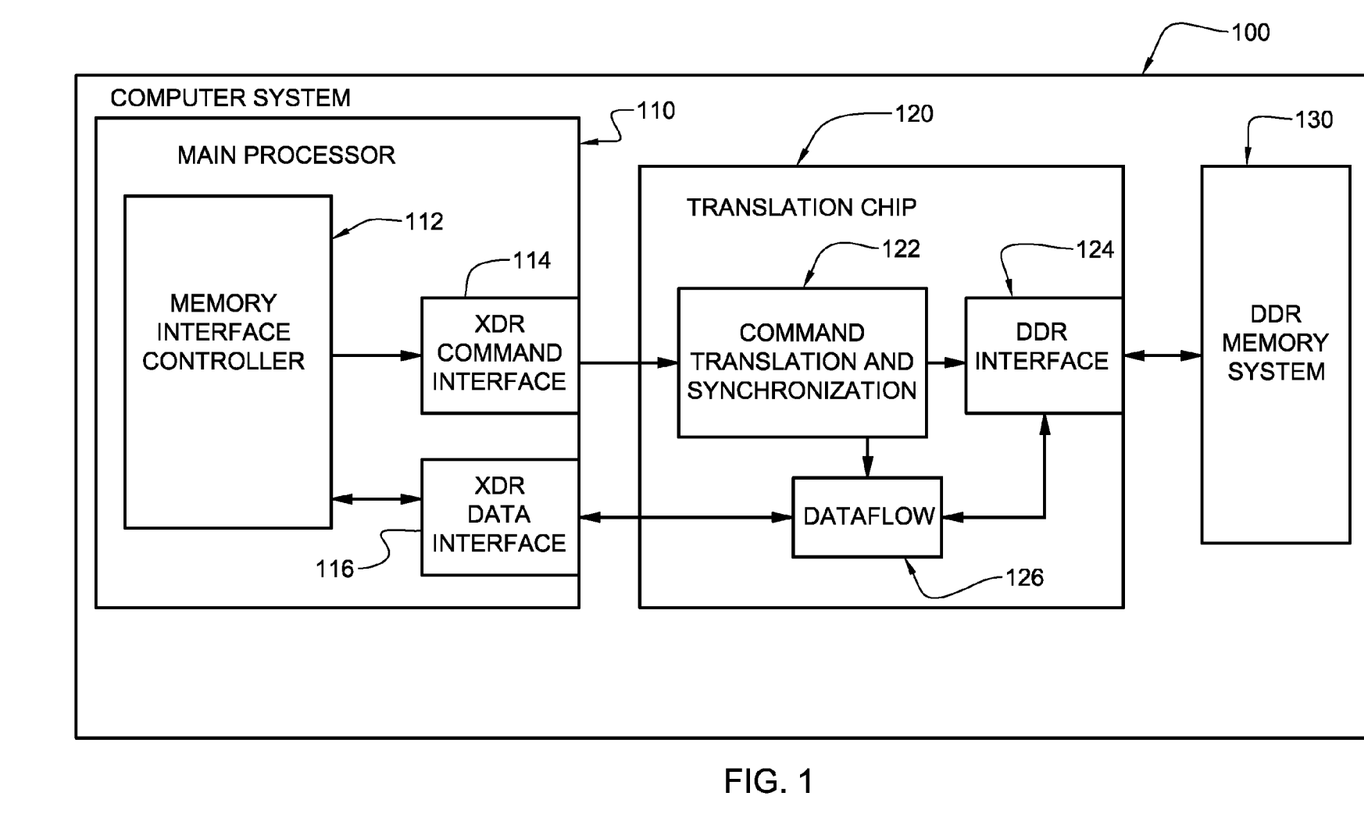
FIG. 1 depicts one embodiment of a computer system including an apparatus for interfacing a processor employing a first memory command format and a memory system employing a second command format, in accordance with an aspect of the present invention.

FIG. 1 is a block diagram of a system 100 employing an interface of a processor 110, such as a main processor, to a memory system 130, such as a DDR memory system. System 100 may be a computer or similar device, and have processor 110 coupled to memory system 130 via a translation circuit or translation chip 120. Processor 110 is adapted to generate and issue functional commands, such as a read, write, refresh, etc., commands to memory system 130. For example, processor 110 may generate a command and associated address in a first format. However, memory system 130 may not be accessible by the command and associated address in the first format, but rather, by a command and associated address of a second format. Therefore, translation chip 120 is adapted to receive the memory system command in the first format (including the associated address), and translate such memory system command to the second format (including an associated address). Translation chip 120 then forwards the memory system command in the second format to the memory system 130 for processing of the command.

More specifically, main processor 110 may include and/or be coupled to a memory interface controller (MIC) 112 adapted to control the flow of data to and from memory system 130. MIC 112 is coupled to a memory interface which may be included in and/or coupled to processor 110. In this example, the memory interface includes an extreme input/output (XIO) interface, comprising both an extreme data rate (XDR) command interface 114 and an extreme data rate (XDR) data interface 116. Typically, a processor employs an XIO link to couple directly to an XDR memory, architected by Rambus, Inc., of Los Altos, Calif. Therefore, the memory system command of the first format generated by processor 110 is an XDR memory system command. However, for the reasons noted above, it may also be advantageous to employ a memory system 130 which is a double data rate (DDR) memory system (e.g., a DDR2 or DDR3 memory system), which may be less expensive, and have more storage capacity than XDR memory.

To facilitate use of a DDR memory system with a processor employing an XIO link, an interface (i.e., translation chip 120) is provided, which translates a memory system command of a first format received from the processor to a memory system command of a second format, which may be employed to access DDR memory system 130. The XIO link is a narrow, fast link which provides high bandwidth to memory by enabling 8 bits of data to be sent on each of a plurality of lines in the link per clock cycle from the MIC 112 to translation chip 120. Consequently, the XIO link may be capable of achieving signal rates of at least 3.2 Gbps, which may allow the MIC 112 and/or processor 110 coupled thereto to use fewer I/O, and therefore, save on die size and costs. More specifically, in certain embodiments, the XIO link may include a 72-bit bus coupling processor 110 to translation chip 120. However, this bus may be wider or narrower. Further, the link coupling processor 110 to translation chip 120 may be wider or narrower. The bus is adapted to transmit read, write, refresh and/or similar commands thereon. Because this link is fast and narrow, a reduced number of processor pins may be required to couple to the link. For example, 72 processor pins may be required to couple to the bus (although a larger or smaller number of pins may be required). Thus, the overall number of pins included in the processor may be reduced, that is, compared to the number of pins required to couple the processor to a different type of link.

As noted, translation chip 120 is provided to couple processor 110, which executes an application requiring access to a large amount of memory, via an XIO interface and an XIO link to a DDR memory system. This interface is accomplished by automatically converting an XDR memory system command to a DDR memory system command, such as a DDR2/3 command and data protocol. By indirectly coupling an XIO link to a DDR memory, the translation circuit provides system 100 with the advantage of using the XIO link (e.g., fewer pins consumed on processor 110), and the advantages of using DDR memory (e.g., lower cost and higher storage capacity than other memories).

As stated, translation chip 120 may receive a memory system command in the first command format from processor 110 via a first link and convert such command and associated address to a memory system command in a second format. Further, the translation chip 120 may be coupled to the memory system via a second link. The second link may be a link that is slower than the first, such as a DDR link. However, the second link may be wider than the first (e.g., so that the bandwidth of the second link matches that of the first). As one example, the second link may include a 288-bit bus. However, the bus may be wider or narrower as long as the second link is wider than the first link. Further, the second link may include a larger or smaller number of and/or different types of busses. The bus may be adapted to transmit memory system commands of the second format, including addresses associated with the memory command and/or data associated therewith on the second link for the memory system. Therefore, translation chip 120 may be adapted to receive data bits from a 72-bit bus (i.e., the XIO link) and transmit the data bits on a 288-bit bus (i.e., the DDR link). In this manner, system 100 may employ the narrow, fast link to reduce the size and/or cost associated with constructing the processor, and system 100 may still employ an inexpensive memory system 130 having a large storage capacity.

In the example illustrated in FIG. 1, an XDR memory system command is forwarded via XDR command interface 114 from memory interface controller 112 to translation chip 120, and specifically, to a command translation and synchronization circuit 122 which translates the XDR memory system command to a DDR memory system command. The DDR memory system command is then output via a DDR interface 124 of translation chip 120 across the second link to DDR memory system 130. Command translation and synchronization circuit 122 controls timing of DDR interface signals at DDR interface 124, as well as controlling the timing of dataflow 126 from DDR interface 124 back to XDR data interface 116 of processor 110 if a read operation, or timing of dataflow 126 from XDR data interface 116 to DDR interface 124 if writing data to DDR memory system 130.

Figure 2:
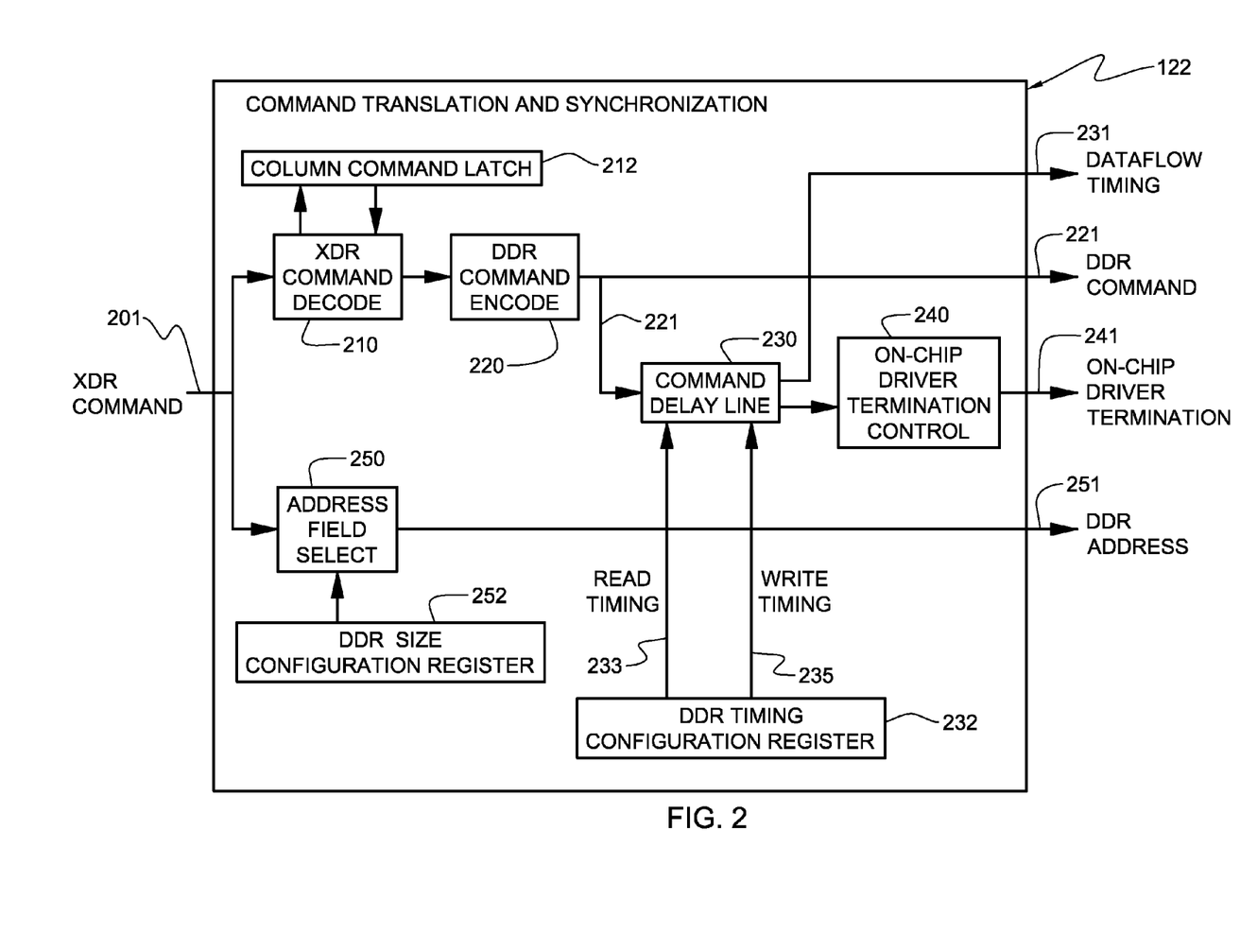
FIG. 2 depicts a more detailed embodiment of the command translation and synchronization circuit of the interface apparatus of FIG. 1, in accordance with an aspect of the present invention.

FIG. 2 illustrates one embodiment of command translation and synchronization circuit 122. In this embodiment, an XDR command 201 is received at XDR command decode logic 210 for identifying the command and translating thereof (i.e., encoding) into a DDR command format. As understood in the art, and depending upon the memory system command type, the memory system command may include for a read or a write command an activate command, as well as one or more read or write column commands. As explained further below, an XDR memory command employs two write column commands, while a DDR memory command employs only one column command. Thus a column command latch 212 is employed by XDR command decode logic 210 to track whether a given column command is the first column command or the second column command of an XDR memory system command. As explained further below, the second column command is discarded when converting to a DDR memory command format.

DDR command encode logic 220 outputs the corresponding memory system command in DDR format using, for example, a conversion table such as Table 1 below. By way of example, Table 1 sets forth conversion from various XDR commands to DDR2/3 commands.

TABLE 1

| XDR Command | DDR2/3 Command |
| --- | --- |
| NOOP | Deselect |
| Row Activate | Activate |
| Column Read $1^{st}$ | Posted CAS Read with Auto-Precharge |
| Column Read $2^{nd}$ | Deselect |
| Column Write $1^{st}$ | Posted CAS Write with Auto-Precharge and all Data Masks Inactive |
| Column Write $2^{nd}$ | Deselect |
| Column Masked Write $1^{st}$ | Posted CAS Write with Auto-Precharge and Data Masks Calculated |
| Column Masked Write $2^{nd}$ | Deselect |
| Row Precharge 0-3 | Deselect |
| Power Down | Deselect |
| Refresh Activate | Refresh |
| Refresh Increment | Refresh |
| Refresh Precharge | Deselect |
| Load Refresh Register 0-2 | Deselect |

The above conversion example assumes that the XDR interface is using a burst-of-four column operation, which yields 64 bytes of data. As one specific example, a 128-byte cache line may be used so the XDR memory interface controller may use two column commands per activate command to transfer 128 bytes of data. The DDR2/3 interface is set up to use a burst-of-eight column operation. Therefore, the second XDR column command is discarded, as noted. This is accomplished by having a latch per bank that is set when an XDR column command is sent, and reset when an XDR activate command is sent. An XDR column command that arrives while the column command latch 212 is set is discarded.

Further, the XDR interface allows pre-charge commands to be sent up to three cycles ahead of when they are needed. It is up to the XDR processor chip to provide the precharges at the correct time. To simplify the conversion of these commands to a DDR interface, auto-precharges are used on the DDR memory system (e.g., in accordance with the DDR2 specification) and the XDR pre-charges are discarded.

The DDR command encode circuit 220 outputs a DDR command 221 to the DDR interface 124 (FIG. 1) for forwarding across the second link to the DDR memory system 130. Along with translating the memory system command from the first format to the second format, command translation and synchronization circuit 122 controls timing of one or more signals associated with processing the memory system command in the second format. As shown, the DDR command 221 gates a command delay line 230, which may comprise a first in first out chain of latches for providing timing signals with appropriate timing delays, i.e., based on whether the command is a read command or a write command. A read timing indication 233 and a write timing indication 235 are provided by a DDR timing configuration register 232. The JEDEC DDR specification defines different timing modes wherein cache latency can be set to different values indicative, for example, of how long after a column command that data transfer happens. Software sets the DDR timing configuration register 232 with, for example, power on of the system, and depending on the DDR memory system configuration employed. Output from the command delay line 230 is a dataflow timing signal 231, and a signal which drives on-chip driver termination control 240. On-chip driver termination control 240 outputs an on-chip driver termination signal 241 to DDR interface 124 (FIG. 1).

More particularly, a variable delay scheme (command delay line 230) is employed to signal dataflow 126 (FIG. 1) when data associated with a read command or a write command is coming, and to generate the signals necessary to drive the on-chip driver termination control. XDR commands are decoded into chip select 1 and 0, write enable, and read enable, and are placed onto a stack of registers that are offset by one clock cycle each (i.e., command delay line 230). The decoded commands are then read from the stack of registers at a programmable delay. On-chip driver termination control signals are generated for on-chip termination, and for the DDR interface with either one or two ranks of memory by tapping off the command at the appropriate delay for the given command type, which is a signal that is ON for four (4) cycles, one for each of the four bursts for a read command or a write command.

The XDR command 201 is also received at an address field select logic 250, which depending upon the type of command (for example, an activate or column command), selects the address bits for the address associated with the DDR command. Bit selection employs a DDR size configuration register 252, which can be set by software upon power on of the system. The configuration register holds an indication of the configuration of the DDR memory system and provides an indication of which bits of a received address are needed for forwarding to the DDR interface.

Figure 3:
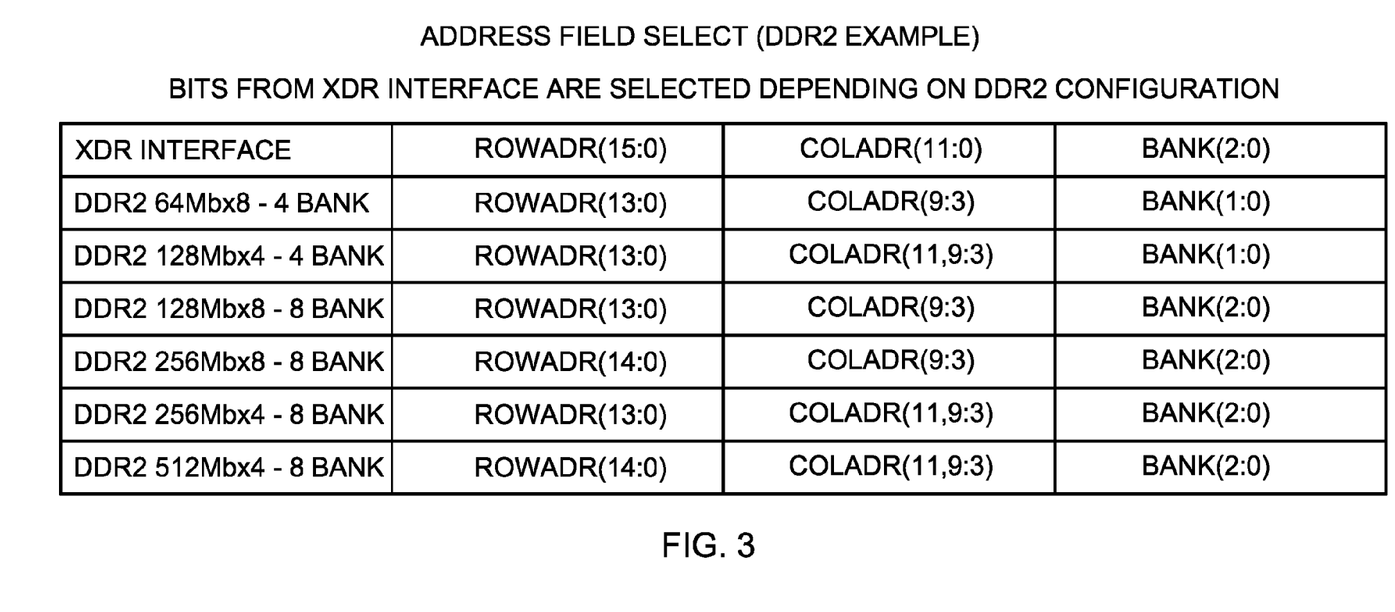
FIG. 3 depicts one example of bits selected by the address field select logic of the command translation and synchronization circuit of FIG. 2, for converting from an XDR address configuration to a DDR2 address configuration, in accordance with an aspect of the present invention.

FIG. 3 depicts one embodiment of row and column address selection for particular DDR2 memory configurations. As shown, depending upon the configuration, 14 or 15 row address bits are selected from the associated address in XDR format for the DDR formatted address (i.e., bits 13:0 or 14:0), and 7 or 8 column address bits are selected (e.g., bits 9:3 or 11,9:3). Similarly, bank bits are selected dependent upon the configuration as well. The DDR2 examples illustrated in FIG. 3 are JEDEC standard configurations. The bank configuration refers to the number of banks of a DDR dual inline memory module (DIMM) within which the memory chips are organized. XDR memory is typically organized into 8 banks. With respect to the column address bits, when accessing DDR memory, 8 beats of data are automatically written or retrieved, and thus, the bottom three column addresses are automatic. So COLADR (2:0) bits are dropped, and when converting, COLADR (9:3) bits are selected from the XDR interface column address. Due to JEDEC specification, column address bit 10 is not used as an address bit in DDR2, and thus, bit 11 is selected from the column address at the XDR interface.

Figure 4:
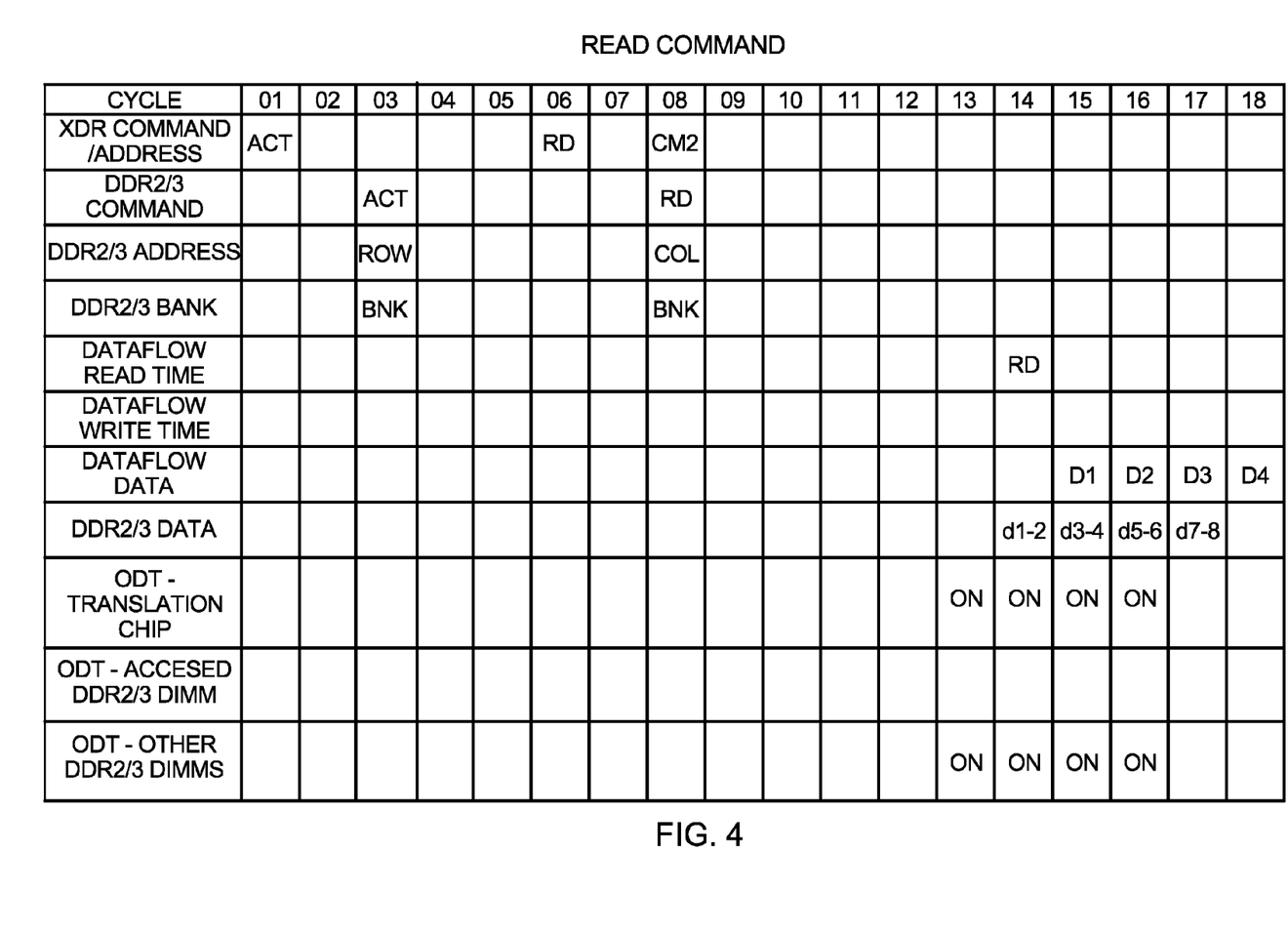
FIG. 4 depicts a timing chart illustrating one embodiment of read command and address conversion from an XDR format to a DDR2/3 format, in accordance with an aspect of the present invention.
Figure 5:
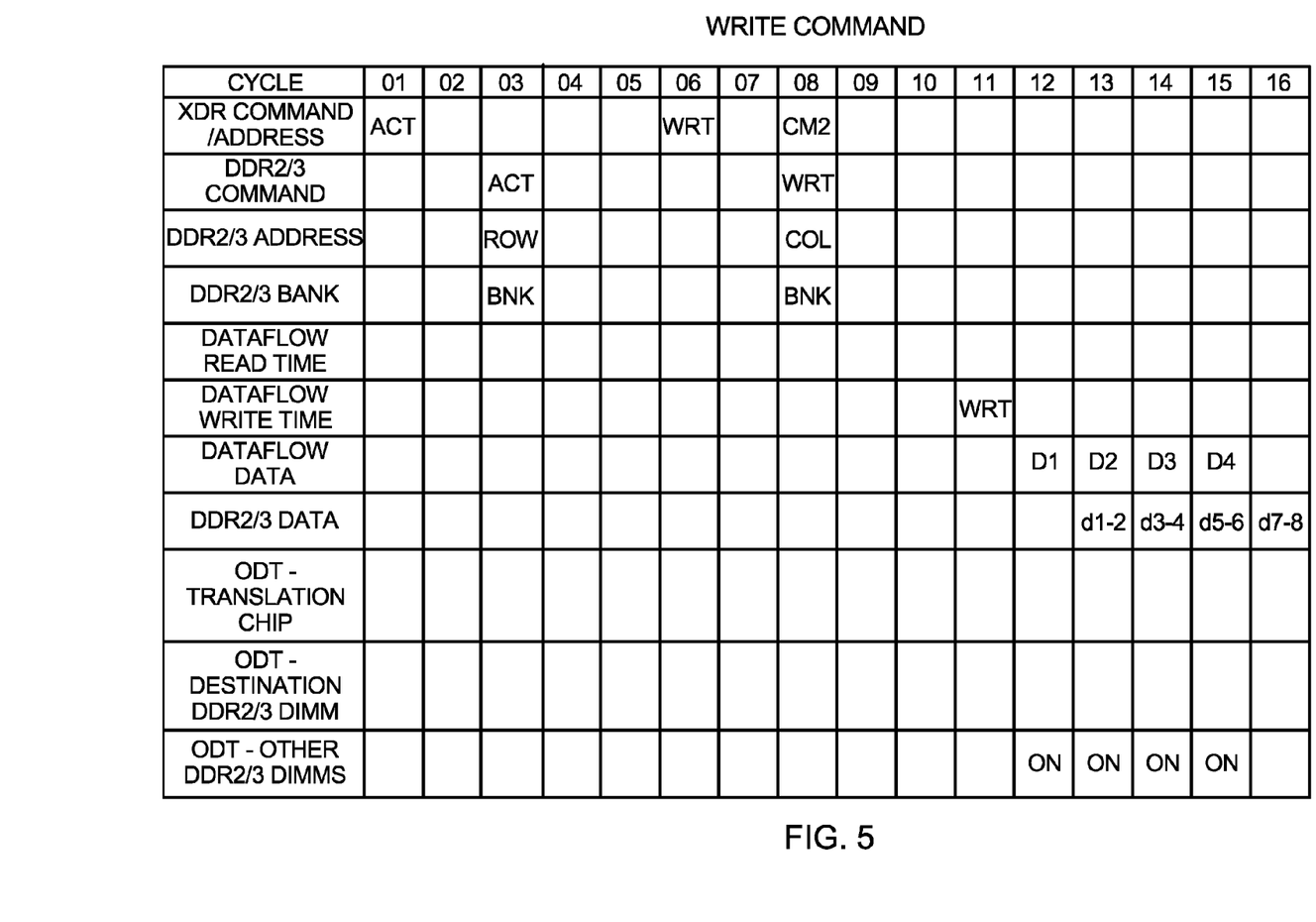
FIG. 5 depicts a timing chart illustrating one embodiment of write command and address conversion from an XDR format to a DDR2/3 format, in accordance with an aspect of the present invention.
Figure 6:
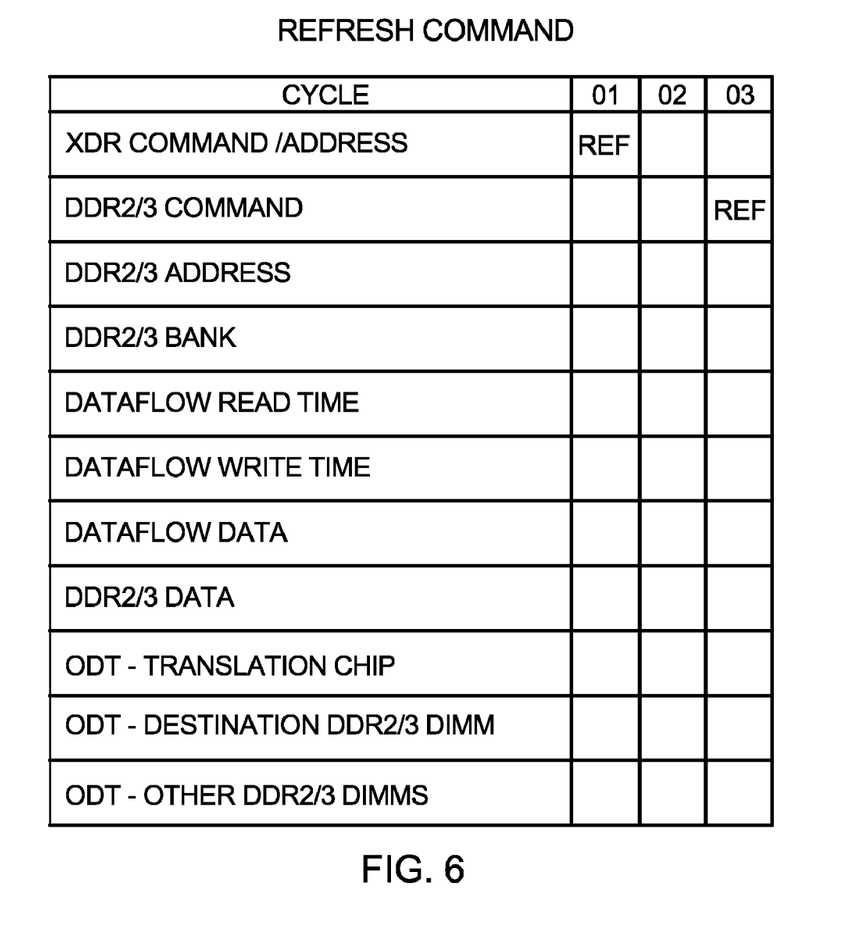
FIG. 6 depicts a timing chart illustrating one embodiment of refresh command conversion from an XDR format to a DDR2/3 format, in accordance with an aspect of the present invention.

By way of further example, FIGS. 4-6 illustrate timing charts for converting XDR read, write and refresh commands and associated addresses to corresponding DDR2/3 commands and associated addresses.

Beginning with FIG. 4, a timing chart for read command conversion is illustrated. The cycles refer to the translation chip clock cycles, which in one example, equal the DDR2/3 clock cycles of the memory system. In this example, in Cycle 1, an activate command and address are received from the XDR interface 114 (FIG. 1). In Cycle 2, the XDR activate command is decoded, the DDR2/3 command is encoded, and the DDR2/3 row address is selected. In Cycle 3, the activate command is sent to the DDR2/3 interface 124 (FIG. 1), along with the row address and the bank select bits. Pursuant to JEDEC standard timing for the DDR format, Cycle 4 and Cycle 5 are unused to process this particular command/address; however, the cycles could be employed to process another command received at the translation chip.

A first read column command is received from the XDR interface in Cycle 6, and this first XDR read column command is decoded, the corresponding DDR2/3 read column command is encoded (i.e., generated), and the DDR2/3 column address bits are selected. In Cycle 8, a second column command is received from the XDR interface, the first read column command is sent to the DDR2/3 interface, and the column address and bank select are sent to the DDR2/3 interface. In Cycle 9, the second XDR column command is dropped since it is not needed, because, as noted above, DDR memory employs an 8-beat access (which is contrasted with XDR memory which employs a 4-beat address). To achieve the 8 beats of data out of the DDR memory, the memory interface controller 112 (FIG. 1) is configured to send an activate command and two column commands. Further, the memory interface controller is configured to set the timing parameters so that the DDR2/3 timing requirements such as RAS to CAS delay time (tRCD) are met.

Cycles 10, 11 & 12 are cycles of delay before the data is due back from the DDR interface pursuant to JEDEC specification. In Cycle 13, the translation chip and non-accessed DDR2/3 DIMM on-chip driver terminations are turned ON, and in Cycle 14, the read timing signal is sent to the dataflow logic, beats 1 and 2 of data (d1-2) arrive on the DDR2/3 interface, and the on-chip driver termination signals remain ON. In Cycle 15, the first beat of data (D1) arrives at the dataflow 126. Again, one beat of data in the dataflow equals two beats of data on the DDR2/3 interface. Further, beats 3 and 4 (d3-4) on the DDR2/3 interface are received, and the on-chip driver terminations remain ON. In Cycle 16, the translation chip and non-accessed on-chip driver terminations remain ON, the second beat of data (D2) arrives at the dataflow, and beats 5 and 6 (d5-6) of data arrive on the DDR2/3 interface from the DDR memory system. In Cycle 17, the translation chip and non-accessed on-chip driver terminations are turned off, the third beat of data (D3) arrives at the dataflow logic, and beats 7 and 8 (d7-8) of data arrive on the DDR2/3 interface. In Cycle 18, the fourth beat of data (D4) arrives at the dataflow of the translation chip.

FIG. 5 illustrates one timing chart example of a write command conversion. In this example, an activate write command and a row address are received from the XDR interface in Cycle 1. In Cycle 2, the XDR activate command is decoded, the corresponding DDR2/3 command is encoded or generated, and the DDR2/3 row address is selected. In Cycle 3, the activate command is sent to the DDR2/3 interface, as well as the row address and the bank select signal. Cycles 4 and 5 are unused.

In Cycle 6, a first write column command is received from the XDR interface. In Cycle 7, the first XDR write column command is decoded, the DDR2/3 write column command is encoded, and the DDR2/3 column address is selected. In Cycle 8, the second column command (CM2) is received from the XDR interface, the first write column command (WRT) is sent to the DDR2/3 interface, as well as the column address and bank select signals. In Cycle 9, the second XDR column command is dropped.

In Cycle 11, a write timing signal is sent to the dataflow logic to let the dataflow know that write data will be transitioning through the translation chip. In Cycle 12, a first beat of data (D1) arrives at the dataflow (wherein one beat in the dataflow equals two beats of data on the DDR2/3 interface), and non-destination DDR2/3 on-chip driver terminations are turned ON. In Cycle 13, the second beat of data (D2) arrives at the dataflow, non-destination DDR2/3 on-chip driver terminations stay ON, and beats 1 and 2 of data (d1-2) are sent to the DDR2/3 interface. In Cycle 14, the third beat of data (D3) arrives at the dataflow, the non-destination DDR2/3 on-chip driver terminations remain ON, and beats 3 and 4 of data (d3-4) are sent to the DDR2/3 interface. In Cycle 15, the fourth beat of data (D4) arrives at the dataflow, the non-destination DDR2/3 on-chip driver terminations stay ON, and beats 5 and 6 of data (d5-6) are sent to the DDR2/3 interface. In Cycle 16, the non-destination DDR2/3 DIMM on-chip driver terminations are turned off, and beats 7 and 8 of data (d7-8) are sent to the DDR2/3 interface.

FIG. 6 depicts one embodiment of timing control for refresh command conversion from an XDR format to a DDR2/3 format. In Cycle 1, a refresh command is received at the XDR interface. In Cycle 2, the XDR refresh command is decoded, and the DDR2/3 command is encoded, that is, the specific DDR2/3 refresh command format is generated, for example, from Table 1 discussed above. This refresh command is then sent to the DDR2/3 interface in Cycle 3.

Although preferred embodiments have been depicted and described in detail herein, it will be apparent to those skilled in the relevant art that various modifications, additions, substitutions and the like can be made without departing from the spirit of the invention, and that these are therefore considered to be within the scope of the invention as defined in the following claims.

What is claimed is:

1. An apparatus for interfacing a processor employing a first command format and a memory employing a second command format, the apparatus comprising:
   a translation circuit adapted to couple a processor employing a first command format to a memory employing a second command format, the translation circuit:
   receiving a memory system command from the processor in the first command format, the memory system command in the first command format comprising a memory command, an associated address and data protocols for the memory command, and wherein the first command format comprises an extreme data rate (XDR) command format;
   automatically converting the memory system command in the first command format to a memory system command in a second command format, the second command format comprising a double data rate (DDR) format, and wherein the automatically converting comprises adjusting at least one of the memory command or the data protocols for the memory command of the memory system command in the first command format in converting to the memory system command in the second command format; and
   wherein the automatically converting comprises selecting address bits from the associated address in the XDR format for use in the associated address in the DDR format, wherein the selecting address bits includes referencing a DDR size configuration register to determine which row address bits and column address bits of the associated address in the XDR format to include in the associated address of the DDR format.

2. The apparatus of claim 1, wherein the translation circuit is implemented as a translation chip adapted to couple the processor to the memory.

3. The apparatus of claim 1, wherein the translation circuit further comprises a command translation and synchronization circuit, the command translation and synchronization circuit including XDR command decode logic and DDR command encode logic for receiving the memory system command from the processor in the first command format and automatically converting the memory system command from the first command format to the second command format, wherein the XDR command decode logic employs a column command latch in automatically converting the memory system command in the first command format to the second command format, the first command format including a first command and an associated address in XDR format and the second command format including a second command and an associated address in DDR format, and wherein the column command latch is employed in identifying for dropping a second XDR column command of the associated address of the memory system command in XDR format.

4. The apparatus of claim 1, wherein the translation circuit further comprises a command translation and synchronization circuit, and the memory system command is received via an extreme input/output (XIO) link coupled to the command translation and synchronization circuit, the XIO link being controlled by an XDR memory interface controller associated with the processor, and wherein the apparatus further comprises a DDR interface coupled to the command translation and synchronization circuit, the DDR interface facilitating forwarding of the memory system command in the second command format to the memory, and wherein the command translation and synchronization circuit further comprises a command delay line gated by the memory system command in the second command format, the command delay line outputting one or more timing signals, the one or more timing signals facilitating processing of the memory system command in the second command format.

5. The apparatus of claim 4, wherein the one or more timing signals comprise a dataflow timing signal for the translation circuit and an on-chip driver termination signal for the memory.

6. The apparatus of claim 1, wherein the memory system command is received from the processor via an extreme input/output (XIO) link, the XIO link being controlled by an XDR memory interface controller associated with the processor, and wherein the XDR memory interface controller adjusts at least one timing parameter of the memory system command in the first command format so that DDR timing requirements for the memory system command in the second command format are met.

7. The apparatus of claim 1, wherein the memory system command in the first command format comprises a first command and an associated address in XDR format, and the memory system command in the second command format comprises a second command and an associated address in DDR format, and wherein the translation circuit comprises address field select logic which selects address bits from the associated address in XDR format for use in the associated address in DDR format, the address field select logic referencing a DDR size configuration register to determine which row address bits and column address bits of the associated address in XDR format to include in the associated address in DDR format based on a configuration of the memory.

8. The apparatus of claim 1, wherein the translation circuit further comprises a dataflow path, the dataflow path being coupled between an XDR data interface associated with the processor and a DDR interface of the translation circuit coupled to the memory and wherein the translation circuit generates dataflow timing signals for facilitating at least one of transfer of read data from the memory to the processor, or transfer of write data from the processor to the memory.

9. A system comprising:
   a processor adapted to generate a memory system command in a first command format, the memory system command in the first command format comprising a memory command, an associated address and data protocols for the memory command, and wherein the first command format comprises an extreme data rate (XDR) command format;
   a memory accessible by a memory system command in a second command format, the second command format comprising a double data rate (DDR) format; and
   a translation circuit coupled to the processor and to the memory for converting a memory system command in the first command format received from the processor to a memory system command in the second command format for forwarding to the memory, and wherein the converting comprises adjusting at least one of the memory command or the data protocols for the memory command of the memory system command in the first command format in converting to the memory system command in the second command format, the converting comprising selecting address bits from the associated address in the XDR format for use in the associated address in the DDR format, wherein the selecting address bits includes referencing a DDR size configuration register to determine which row address bits and column address bits of the associated address in the XDR format to include in the associated address of the DDR format.

10. The system of claim 9, wherein the processor is coupled to the translation circuit via an extreme input/output (XIO) link, and wherein the translation circuit is coupled to the memory via a DDR link, and wherein the translation circuit is a translation chip.

11. The system of claim 10, wherein the translation chip comprises a command translation and synchronization circuit, the command translation and synchronization circuit including XDR command decode logic and DDR command encode logic for receiving the memory system command from the processor in the first command format and automatically converting the memory system command from the first command format to the second command format, wherein the XDR command decode logic employs a column command latch in automatically converting the memory system command from then first command format to the second command format, the first command format including a first command and an associated address in XDR format and the second command format including a second command and an associated address in DDR format, and wherein the column command latch is employed in identifying for dropping a second XDR column command of the associated address of the memory system command in XDR format.

12. The system of claim 9, wherein the translation circuit further comprises a command translation and synchronization circuit, and the memory system command is received via an extreme input/output (XIO) link coupled to the command translation and synchronization circuit, the XIO link being controlled by an XDR memory interface control associated with the processor, and wherein the translation circuit further comprises a DDR interface coupled to the command translation and synchronization circuit, the DDR interface facilitating forwarding of the memory system command in the second command format to the memory, and wherein the command translation and synchronization circuit further comprises a command delay line gated by the memory system command in the second command format, the command delay line outputting one or more timing signals for facilitating processing of the memory system command in the second command format, the one or more timing signals comprising at least one of a dataflow timing signal for the translation circuit or an on-chip driver termination signal for the memory.

13. The system of claim 9, wherein the memory system command is received from the processor via an extreme input/output (XIO) link, the XIO link being controlled by an XDR memory interface controller associated with a processor, and wherein the XDR memory interface controller adjusts at least one timing parameter of the memory system command in the first command format so that DDR timing requirements for the memory system command in the second command format are met.

14. The system of claim 9, wherein the memory system command in the first command format comprises a first command and an associated address in XDR format, and the memory system command in the second command format comprises a second command and an associated address in DDR format, and wherein the translation circuit comprises address field select logic which selects address bits from the associated address in XDR format for use in the associated address in DDR format, the address field select logic referencing a DDR size configuration register to determine which row address bits and column address bits of the associated address in XDR format to include in the associated address in DDR format based on a configuration of the memory.

15. A command translation method comprising:
   receiving a system processor-issued memory system command in a first command format, the memory system command in the first command format comprising a memory command, an associated address and data protocols for the memory command, and wherein the first command format comprises an extreme data rate (XDR) command format;
   automatically converting the memory system command in the first command format to a memory system command in a second command format, the second command format comprising a double data rate (DDR) command format, and wherein the automatically converting comprises adjusting at least one of the memory command or the data protocols for the memory command of the memory system command in the first command format in converting to the memory system command in the second command format; and
   wherein the automatically converting comprises selecting address bits from the associated address in the XDR format for use in the associated address in the DDR format, wherein the selecting address bits includes referencing a DDR size configuration register to determine which row address bits and column address bits of the associated address in the XDR format to include in the associated address of the DDR format.

16. The command translation method of claim 15, further comprising forwarding the memory system command in the second command format to a DDR memory system interface coupled to DDR memory, and controlling timing of one or more signals presented to the DDR memory system interface, the one or more signals being associated with processing the memory system command in the second command format.

17. The command translation method of claim 16, wherein the command translation method is implemented within a translation chip and the controlling timing of one or more signals associated with processing the memory system command in the second command format comprises controlling a dataflow timing signal within the translation chip and an on-chip driver termination signal of the DDR memory for facilitating processing of the memory system command in the second command format.

18. The command translation method of claim 15, wherein the memory system command is received via an extreme input/output (XIO) link, the XIO link being controlled by an XDR memory interface controller, and wherein the method further comprises adjusting at least one timing parameter of the memory system command in the first command format via the XDR memory interface controller so that DDR timing requirements for the memory system command in the second command format are met.

19. The command translation method of claim 15, wherein the automatically converting further comprises referencing a DDR timing configuration register to determine a cycle delay from the memory system command in the second command format for use in generating at least one of a dataflow timing signal or an on-chip driver termination signal associated with processing the memory system command in the second command format, the cycle delay being dependent on whether the memory system command is a read command or a write command.

20. The command translation method of claim 15, wherein the memory system command is one of a memory system write command or a memory system read command, and wherein the automatically converting includes automatically dropping a second XDR column command from the associated address of the memory system command in the XDR format when converting to the associated address of the memory system command in the DDR format.

21. The command translation method of claim 20, wherein the memory system command is received via an extreme input/output (XIO) link, and wherein the method further comprises forwarding the memory system command in the second command format to a DDR link, and wherein the method further comprises for a memory system read command returning one beat of data to the XIO link for two beats of data on the DDR link, and wherein the method further comprises for a memory system write command driving two beats of data on the DDR link for one beat of data on the XIO link.

22. The command translation method of claim 15, wherein the DDR command format is one of a DDR2 command format or a DDR3 command format.

* * * * *